(12) United States Patent
Daouphars et al.

(10) Patent No.: US 8,806,216 B2
(45) Date of Patent: Aug. 12, 2014

(54) IMPLEMENTATION PROCESS FOR THE USE OF CRYPTOGRAPHIC DATA OF A USER STORED IN A DATA BASE

(75) Inventors: Raphaël Daouphars, Paris (FR); Jean-Marc Desperrier, Paris (FR); Laurent Fournié, Paris (FR)

(73) Assignee: Dictao, Paris (FR)

( * ) Notice: Subject to any disclaimer, the term of this patent is extended or adjusted under 35 U.S.C. 154(b) by 38 days.

(21) Appl. No.: 13/608,443

(22) Filed: Sep. 10, 2012

(65) Prior Publication Data

US 2013/0166911 A1 Jun. 27, 2013

(30) Foreign Application Priority Data

Sep. 9, 2011 (FR) ...................................... 1158042

(51) Int. Cl.
*G06F 21/00* (2013.01)
(52) U.S. Cl.
USPC ........... 713/176; 713/168; 713/180; 380/277; 380/286; 726/26; 726/30
(58) Field of Classification Search
None
See application file for complete search history.

(56) References Cited

U.S. PATENT DOCUMENTS

| 5,604,801 | A * | 2/1997 | Dolan et al. ................... 713/159 |
| 6,453,416 | B1 * | 9/2002 | Epstein ......................... 713/170 |
| 7,237,114 | B1 | 6/2007 | Rosenberg |
| 7,725,723 | B2 | 5/2010 | Landrock et al. |
| 2002/0078355 | A1 * | 6/2002 | Samar ........................... 713/176 |
| 2002/0129257 | A1 * | 9/2002 | Parmelee et al. ............. 713/180 |
| 2003/0204732 | A1 | 10/2003 | Audebert et al. |
| 2004/0210756 | A1 * | 10/2004 | Mowers et al. ................ 713/168 |
| 2005/0102244 | A1 * | 5/2005 | Dickinson et al. ............. 705/74 |
| 2005/0114670 | A1 * | 5/2005 | Bowe et al. .................... 713/180 |
| 2007/0136599 | A1 * | 6/2007 | Suga ............................. 713/176 |
| 2008/0163337 | A1 * | 7/2008 | Tuliani et al. ..................... 726/2 |
| 2009/0172407 | A1 * | 7/2009 | Smith et al. ................... 713/183 |
| 2010/0217987 | A1 * | 8/2010 | Shevade ........................ 713/175 |

OTHER PUBLICATIONS

Damgard, et al., "Commitment Schemes and Zero-Knowledge Protocols", Internet Citation, 1999, pp. 1-35, XP002381007, http://www.daimi.au.dk/ivan/ComZK06.pdf.
French Search Report, Issued in FR1158042, dated Apr. 24, 2012, 2 pages.

* cited by examiner

*Primary Examiner* — Jung Kim
*Assistant Examiner* — Adrian Stoica
(74) *Attorney, Agent, or Firm* — Rothwell, Figg, Ernst & Manbeck PC (57) ABSTRACT

A security module ("SM") implements user cryptographic data by means of a user terminal. The cryptographic data is encrypted by a first encryption key established from a secret key from the terminal and the user's authentication element and by a second encryption key specific to the SM. An authentication is performed between the SM and the terminal, based on an asymmetric cryptographic protocol, and, in the event of a positive authentication of the SM and the terminal, an authentication of the SM and the user is performed. In the event of positive authentication between the SM and the terminal and between the SM and the user, the SM obtains the user's cryptographic data, and the terminal calculates the first encryption key and sends the first encryption key to the SM. The user's cryptographic data is decrypted by the SM using the second encryption key and then the first encryption key.

13 Claims, 3 Drawing Sheets

IMPLEMENTATION PROCESS FOR THE USE OF CRYPTOGRAPHIC DATA OF A USER STORED IN A DATA BASE

CROSS REFERENCE TO RELATED APPLICATION(S)

This application claims priority to French Patent Application No. FR1158042 filed on Sep. 9, 2011, the entire contents of which are incorporated herein by reference.

The present invention concerns the technical field of the use, in a secure manner, of a user's cryptographic data to perform cryptographic processing by means of this data.

In the context of the present invention, by a user's cryptographic data is meant cryptographic data that it is appropriate to keep secret in order to maintain the reliability of the cryptographic processing and of the process in the context of which it occurs. In the context, for example, of a process operating in a Public Key Infrastructure (PKI), the cryptographic data within the context of the invention comprises the user's secret key which should only be usable by the latter or with the latter's permission and, possibly, known by the latter, as opposed to the user's public key which can be known to anyone and everyone and is usable by everyone without any risk of corruption of the cryptographic processes implementing the user's public key/secret key pair.

In order to control the use of such cryptographic data belonging to a user, a known method is to implement a smart card comprising a security module within which the user's cryptographic data is stored. Access to this cryptographic data and its use within the smart card's security module is then controlled through the use of a code known only to the user, which the user enters at the time the smart card is unlocked. The reliability of such a smart card has been widely demonstrated. However, the use of a smart card requires, at the level of the computer system requiring the implementation of the user's cryptographic data, the availability of a smart card reader and all the programmes or drivers required for the operation of the reader and for access to the smart card itself. However, this hardware and software constraint is not compatible with the use of mobile computing systems such as laptop computers, tablet computers or smart phones which rarely provide the option to implement a smart card reader.

In order to achieve a signature on a signature server using cryptographic data associated with a specific user, a document U.S. Pat. No. 7,725,723 B2 proposed authenticating both the user and the terminal that he/she uses before authorizing the signing of data transmitted by the user.

However this document's objective of ensuring that the cryptographic data is actually under the user's exclusive control faces several difficulties with regard to the methods that are proposed.

As the cryptographic data in this solution is only encrypted by means of the signature server, any attack on the signature server, or where an attacker takes advantage of the corruption of one of this server's administrators, may permit the use of the key without the approval of its rightful owner.

Above and beyond this risk, this has another consequence, which is the absence of a direct and immutable link connecting the terminal, the user, and the cryptographic data.

The absence of such a link means that any weakness in the server which could lead to a possibility of the incorrect identification of the terminal, the incorrect identification of the user, or an error in the link between the user identified and the cryptographic data to which that user has access, or in circumstances where limitations are present on the keys that can be used from a given terminal, or an error occurring in the link between the terminal and the key or keys authorized from this terminal, immediately gives an ill-intentioned user the opportunity of using the cryptographic data. The same possibility can also be envisaged for a user who does not use the correct terminal, and which may thus be an attacker who succeeds in stealing the user's secret without needing to steal that user's terminal.

In addition, neither can the various means of authentication proposed in the document based on identical secrets present both at the level of the user or the terminal and the server provide non-repudiation properties, ensuring that only secrets in the exclusive possession of the user or the user's terminal could have been legitimately used to open the channel.

In order to try to remove this difficulty, the document proposes in particular the use of an authentication server that only transmits a derived element of the secret to the signature server and not the secret itself. The user or the terminal then calculates the derived value before sending it to the server which compares it with the one it has received.

But an attacker who manages to take possession of the derived value stored on the server just needs to send it directly and be successfully authenticated. As the server does not receive the original secret, it cannot really guarantee that the user actually possesses it. This method therefore does not offer any real advantage as compared with the direct transmission of the secret by both sides and in particular does not permit the non-repudiation of authentication.

Thus most of the methods of authentication advocated by the document amount to the direct comparison of a secret sent by the user with one stored on the server, or to the use of a physical means of external authentication previously supplied to the user. This has the same disadvantages as the use of a smart card.

In addition, according to this document, the terminal is not exclusively linked to a specific user. This means that it is in principle possible to use the key belonging to any user for which it has been possible to obtain an element of identification information on any terminal recognized by the system. This is a consequence of the roaming objective concerning the use of the key addressed by the document, but which seriously weakens the security which should be provided by the dual authentication of the terminal and the bearer.

The document proposes an implementation in which the secret that the user must use for authentication is sent to him/her by a message of the SMS type. In order to introduce genuine dual authentication with this type of means, the user must have both this phone to receive the SMS, and another terminal used in the connection, because dual authentication is not genuine if the same physical element is used to receive the code and for authentication of the terminal.

The solution described cannot therefore be used to provide a level of security by using a single terminal element, without requiring another hardware resource.

In addition, examples of recent attacks in which fraudsters succeeded in obtaining, in place of the legitimate user, the despatch from the telephone operator of a replacement SIM card associated with the same phone number and thus were able to receive the authentication message in place of the user have demonstrated the weakness of this type of solution which in reality does not physically authenticate the user's terminal, but the user's phone number. With this type of attack, the security of the user authentication part described may be compromised, and access to the terminal or a copy of the fixed secret it contains is then enough to use the user's cryptographic data, and the means proposed by the document does not provide a solution.

In the end, in view of the attacks known today, the solution described only provides a high level of security for user authentication when a physical means of external authentication is available, which represents a major constraint for its deployment.

Therefore, it appears there is a need for a new method to implement a user's cryptographic data which, on the one hand, offers guarantees of security equivalent or even superior to those of a smart card, without the same physical constraints at the level of the computing device requiring the implementation of the user's cryptographic data and which, on the other hand, provides a solution to the flaws in the processes according to the prior art referred to above.

In order to achieve this objective, the invention relates to a method for implementation, via a security module, of a user's cryptographic data stored in a database, by means of a terminal used by the user and which communicates with the security module via a communications network, a method comprising the following steps:

an authentication sequence comprising the following successive steps:
  Mutual authentication between the security module and the terminal, based on an asymmetric cryptographic protocol, establishing a secure channel between the security module and the terminal.
  In the event of the positive mutual authentication of the security module and the terminal, mutual authentication of the security module and the user based on an asymmetric cryptographic protocol.
In the event of positive mutual authentication between, on the one hand, the security module and the terminal and, on the other hand, the security module and the user:
  The security module obtains the user's cryptographic data from the database, the cryptographic data being stored in the database in encrypted form, by means of at least a first encryption key established from at least a secret key from the terminal and the user's authentication element and by means of a second encryption key specific to the security module, encryption by means of the second encryption key taking place after encryption by means of the first encryption key.
  The terminal calculates the first encryption key.
  The terminal sends the first encryption key to the security module via the secure channel.
  Implementation of the user's cryptographic data by the security module after decryption, by the security module, of the user's cryptographic data at least first of all by means of the second encryption key and then the first encryption key.

According to the invention, implementation of the user's cryptographic data is only made possible in the event of positive authentication of the user and positive authentication of the terminal as well as positive authentication of the security module. The combination of these two authentications permits a very high level of security.

In fact, authentication is a process that involves the implementation of data which, normally, is only liable to be held by the element being authenticated. This data is generally secret or can only be obtained from the element being authenticated. Identification may be distinguished from authentication in that in the case of identification an item of data is used, usually called the identifier, which is not necessarily secret and may be widely known or disclosed. Thus, identification alone does not offer a great guarantee of security to the extent that an identifier can be used by a third party that has had access given the public or quasi-public character of this identifier. In an identifier/authenticator pair, the identifier may be used as an index used to find the authenticator that needs to be implemented to perform the authentication operation. Thus authentication may be regarded as being, in some cases, a combination of identification and verification of the possession of a secret or information that is particularly difficult to obtain. It must be pointed out that in the case of an electronic system used by a single person, authentication may only implement verification of the knowledge of the secret or the information deemed to be difficult to obtain.

In the case of the authentication of a user, a password is often used as the item of data required for authentication and a passphrase known to the user alone, also called a PIN, or Personal Identification Number. In order to permit easy memorization, a password is generally short and only comprises a limited number of characters, for example between four and six. Thus the password PIN can be easily found in the context of an attack using brute force. In order to characterize this weakness it is said that the password PIN displays low entropy.

In the case of the authentication of an electronic terminal, the size of the authentication data is not a problem and it is possible to use a large data item and one which is, therefore difficult to find in the case of an attack by brute force. The data used for authentication of the terminal thus has high entropy as compared with the user's authentication data.

Its use in combination with authentication of the user and authentication of the terminal used, as proposed by the invention, means that authentication with a higher level of entropy can be obtained, than in the case of authentication that results from the use of the user's password alone. According to the invention, the step whereby the authenticity of the terminal is checked occurs prior to the security module obtaining the user's cryptographic data. Thus, the need for the user's cryptographic data to pass to the security module before positive authentication of the terminal is carried out is avoided.

In the context of the invention, asymmetric authentication should be understood as meaning a protocol by which an entity A proves its identity to another entity B without revealing information that would allow to B to usurp the identity of A. In practice, these protocols are implemented in the form of an exchange of the "challenge/response" type using an asymmetric cryptographic algorithm (RSA, elliptical curve) or zero knowledge disclosure. These protocols ensure non-repudiation of the proof of authentication, because only entity A is able to produce the cryptographic sequence demonstrating its identity.

In the case of the invention, the terminal, the user and the security module are authenticated, all these authentications occurring before transmission of the first secret key. It is important to note that authentication of the security module leads to an extremely reliable method according to the invention, superior to the reliability that would result from authentication of the terminal and the user alone. In fact, if the server is wrong in its authentication of the user, the user's key will not be decipherable. On the other hand, if there is an error in the authentication of the server, the means to decrypt the user's private key, namely the first encryption key, is sent to the wrong entity.

According to the invention, exchanges of data between the terminal and the security module are carried out within the framework of a secure communication established during mutual authentication, thus increasing the resilience of the invention against attacks or leaks. This mutual authentication can be carried out, for example in the context of an SSL (Secure Sockets Layer) protocol, otherwise called TLS (Transport Layer Security). This mutual authentication can also be performed in the context of a zero disclosure protocol using a proof of knowledge of the terminal's secret key and/or proof of knowledge of the user's password.

According to the invention, the first encryption key is established from at least the terminal's secret key and the user's password. The first encryption key is then established by the terminal each time a request is made to implement the user's cryptographic parameters. The first encryption key thus established ensures that the terminal and the user are present and that the user has given his/her consent, by entering his/her password, to the implementation of his/her cryptographic data. In fact, the user's cryptographic data can only be decrypted by means of the first encryption key which can only be established from the terminal's secret key and the user's password. Successful decryption of the user's cryptographic data demonstrates actual possession of the terminal's secret key and knowledge of the user's password, which corresponds to authentication of the terminal and the user.

In addition, storage of the user's cryptographic data in the database in encrypted form, by means of the first encryption key established from at least a secret key belonging to the terminal and the user's authentication element, ensures, on the one hand, that this first encryption key has high entropy through the implementation of the terminal's secret key and, on the other hand, through the implementation of the user's authentication element, that the first encryption key is only calculated in the presence of the user, thus ensuring the non-repudiation by the user of the implementation of his/her cryptographic data.

This first encryption key is therefore an essential element in the security of the solution, and the purpose of the first phase in which the terminal and the user are authenticated is just as much, if not even more, to authenticate the server in relation to the terminal and the user, as the reverse, before passing this secret.

According to the invention, the user's cryptographic data is therefore encrypted by two successive stages of encryption:
  A first stage of encryption of the user's cryptographic data by means of an encryption key chosen between the first encryption key and the second encryption key.
  A second stage of encryption of the encrypted result of the first stage of encryption by means of the encryption key that was not used in the first stage.

Storage of the user's cryptographic data in encrypted form by means of the security module's key in the database that is not necessarily integrated into the security module eliminates the need to secure the database to the extent that only the security module can perform decryption by means of its encryption key which has very high entropy. Thus, it is possible to consider storing the user's cryptographic data in the terminal itself. Such local storage permits the user to exercise full control over the destruction of the cryptographic data if he/she so wishes.

Similarly, the implementation of a security module that communicates with the terminal via a communications network makes the presence of such a security module on the terminal redundant and therefore facilitates the implementation of the method according to the invention.

In the context of the invention, the user's terminal may be any mobile or fixed computer system comprising, on the one hand, a user interface that can be used to send information from the terminal to the user and vice versa from the user to the terminal and, on the other hand, a communication interface with a communication network. The user's terminal may be, for example, a fixed workstation, a personal computer, a laptop computer, a tablet computer, or even a smartphone, without this list being exhaustive.

By communication network should be understood any communication network permitting the transmission or exchange of digital or computer data between two separate computer systems, the distance between them being of no account. In the context of the invention, the term communication network also means, without this list being exhaustive:
  Local area networks or LANs, wired and/or wireless.
  Wide area networks or WANs, wired and/or wireless.
  The Internet.
  The mobile or fixed phone networks.
And a combination of these networks, regardless of the mode of access to them and the protocols implemented on them.

By security module is meant a secure computer system which comprises a limited number of instructions that can be implemented in the context of its normal use in such a manner as to limit the risk of its use being hijacked or corrupted.

According to the invention, the security module can be a software security module or a hardware security module or even a combination of a software and hardware security module. For example, this list not being exhaustive, we can consider:
  A programme run by a hardened operating system, hosted on a physically secure server or a tamper resistant device.
  A hardware security module (HSM) that is either specialized or programmable.
  A combination of the two, in order to carry out the authentication steps via secure software and the steps involving the use of the secret key via secure hardware.

Authentication usually involves a comparison between an authentication element sent by the subject to be authenticated and an authentication element held by the system carrying out the authentication. According to a feature of the invention, the steps used to check authenticity are carried out by means of:
  at least one terminal authentication element.
  at least one user authentication element.
obtained by the security module from the database, the authentication elements being stored in the database in encrypted form, by means of an encryption key specific to the security module. It is important to note that this encryption key is not necessarily the same as the second encryption key used for encryption of the user's cryptographic data.

According to the invention, either a password known only to the user or biometric data such as a fingerprint or retinal image for example that can only be obtained in the presence of the user, can be implemented as an element to authenticate the user. According to the invention, at least two elements can be used to authenticate the user, that is a password and biometric data.

According to the invention, the terminal authentication element may be of any appropriate type. For example a terminal authentication element established in part at least from a secret key belonging to the terminal and stored in the terminal can be used. It would be advantageous for such a secret key to be a key of over 128 bits and preferably a strong key of over 256 bits which then provides high entropy. The terminal authentication element can then comprise the secret key itself. In order to avoid disclosure of the terminal's secret key, the authentication element is, preferably, established from the terminal's secret key without comprising the secret key itself. Thus, the terminal authentication element may comprise a proof of possession of the terminal's secret key intended for use in the context of a zero disclosure authentication protocol. The implementation of such a zero disclosure authentication protocol, also called a Zero Knowledge protocol, means that disclosure of the secret key during the authentication phase is avoided.

The invention's preferred implementation through an authentication protocol of the "augmented zero knowledge" type therefore has the advantage of basing the server's authentication on authentication elements directly linked, in the case of one of them, to the terminal's secret and the other to the user's secret, without ever disclosing these secrets during an authentication attempt, before sending it the first key established from these two elements together. In this implementation, the security of the authentication elements is also important and it is preferable to protect them by means of an encryption key specific to the security module.

In order to facilitate the authentication process, a terminal identification element can also be used, comprising a terminal identifier, Tid. Such an identification element can then be used as an index in the database to retrieve the authentication data used by the security module.

According to the invention the user authentication element can be of any appropriate type and may, for example, comprise biometric data. According to a preferred form of implementation of the invention, a user authentication element can be used, established in part at least from a password entered by the user. In order to preserve the confidentiality of the password, the latter is entered by the user on the terminal at the time the user is authenticated.

The user authentication element can comprise the password itself. However, in order to avoid disclosure of the user's password, the user authentication element should preferably be established from the user's password without comprising the password itself. Thus, the user's authentication element may comprise a proof of knowledge of the password intended for use in the context of a zero disclosure authentication protocol.

Authentication of the security module by the security terminal can be carried out by any suitable means known in the profession. This authentication can be carried out, for example by means of a certificate issued by a third-party certification authority. Authentication of the security module can also be carried by means of a zero disclosure protocol. In this regard, the proof of knowledge established from the terminal's secret key and/or the user's password, held and used by the security module to authenticate the terminal and the user in the context of a zero disclosure protocol, can also be used by the terminal to authenticate the module in the context of a zero disclosure protocol. In fact, the terminal in possession of its secret key, and, where appropriate, of the password entered by the user can calculate the proof of knowledge held by the security module and therefore ensure that the security module is actually in possession of the said proof of knowledge.

According to the invention the database can be saved in the security module. However according to a variant of the invention, in order to avoid "cluttering" the security module, the database is saved on a data server separate from the security module, this data server communicating with the security module via a communication network. This server can then be the terminal itself.

According to another feature of the invention, the security module is integrated into a remote security server separate from the data server and the terminal.

According to yet another feature of the invention, the database includes at least the following data associated with the user:
A user identification element.
A user authentication element.
An identification element belonging to at least one terminal associated with the user.
A terminal authentication element.
The user's cryptographic data.
In order to ensure their privacy, the following data at least:
The user authentication element.
The terminal authentication element.
The user's cryptographic data.
are present in the database in encrypted form, by means of at least one encryption key belonging to the security module.
In order to ensure its integrity, the following data at least:
The association between the user's identifier and authenticator.
The association between the terminal's identifier and authenticator.
The association between the identifier and the user's cryptographic data.
may be present in the database in a form signed by means of at least one signature key belonging to the security module.

According to the invention the user's cryptographic data can be used in different processes and in particular to ensure that different types of data are processed. According to one form of the implementation of the invention, the security module implements the user's cryptographic data to perform cryptographic processing on data to be processed received via the communication network and secured by the secure channel established during mutual authentication between the security module and the terminal.

Within the context of the invention, the data to be processed may for example comprise data used in the context of a digital signature process relating to an electronic document. Thus, the data to be processed may comprise a digital fingerprint for the electronic document.

According to one feature of the invention, the terminal implements a client module which at least manages communications with the security module, the input of the user's authentication element, the authentication sequence and calculation of the first encryption key.

According to another feature of the invention, the client module is suitable for:
Retaining the value of the client authentication element from the time of its input by the user and up to calculation of the first encryption key.
Clearing the value of the authentication element after calculation of the first encryption key.
Clearing the value of the first encryption key after sending it to the security module.

According to yet another feature of the invention, the client module is adapted to prevent access to the value of the client authentication element and to the value of the first encryption key via another resource or another program, from the terminal or external to the terminal, other than the security module.

Still according to another feature of the invention, the client module transmits the data to be processed to the security module.

The client module may be created in any suitable manner and, in particular, may be a software and/or hardware module with enhanced security in order to resist attacks that could try to "eavesdrop" on the entry of the user authentication element and the result of the calculation of the first encryption key.

Of course, the different characteristics, variants and forms of implementation of the method according to the invention can be combined with each other in various combinations to the extent that they are not incompatible with each other or mutually exclusive.

In addition, various other features of the invention emerge from the description in the appendix made with reference to the drawings that illustrate the unlimited forms of the process, consistent with the invention, of implementation of a user's cryptographic data.

It is important to note that in these figures the common structural and/or functional elements as well as the steps common to the different variants or forms may show the same references.

The invention is intended to allow users to implement cryptographic data that is their own to carry out different operations that require the use of this cryptographic data without resorting to a smart card connected to the terminal T. Subsequently, the use of a user's cryptographic data for the execution of a digital signature will be described. However, according to the invention the user's cryptographic data could be used for any other process such as for example the decryption of data that has been previously encrypted using a public key belonging to the user or symmetric encryption and decryption by means of a symmetric key protected by the invention.

Figure 1:
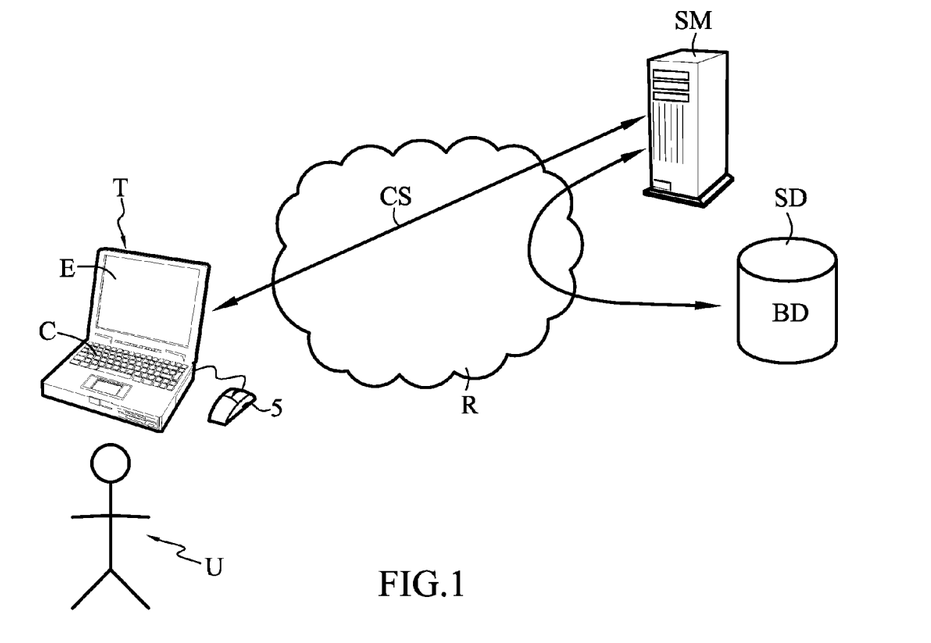
FIG. 1 shows in diagram form, a possible context of implementation of the invention.

In the context shown in FIG. 1, the user U has access to or the use of a terminal T formed, for example, by a personal computer with a user interface. According to the example shown, the user interface consists of a screen E, which may be a touch screen or not, combined with a keyboard C, as well as a pointing device S, such as a mouse for example. The terminal T is additionally connected to a communication network R such as, but not limited to, the Internet for example. The terminal T has a secret key Tsk which is specific to it and which is, for example saved in a security module belonging to terminal T. This security module can be a hardware module or a software module and for example a software key store such as those provided with operating systems or browsers. The terminal's secret key Tsk will preferably be a strong key of a size greater than or equal to 128 bits and even more particularly to be preferred, of a size that is greater than or equal to 256 bits. The user U for example works on a document that he/she wants to sign using the terminal T. To do this, a private or secret key Usk specific to the user U must be used according to a process that is well-known to professionals in the business. This secret key Usk belongs to a secret key Usk/public key Upk pair in the context of a public key infrastructure. The user's secret key Usk is an example of the user's cryptographic data that must be kept in a protected manner to the extent that disclosure of the secret key Usk or if it is compromised would undermine the confidence that can be given to digital signatures associated with the user U. Of course, various other items of cryptographic data could be implemented in the context of the invention.

The invention is designed to ensure the protection of the user U's cryptographic data Usk, on the one hand, by saving it in encrypted format in a database BD, and on the other hand, by ensuring that it is implemented in a security module SM remote from terminal T after the authentication of the user U and the terminal T available for the latter's use.

The security module SM can be created in any appropriate manner and, for example, may comprise a security server comprising hardware security modules (HSM) and implementing security software and/or security software modules. The security module SM is connected to the communications network R. The security module SM also includes at least one encryption key SMk that is specific to it and which it alone possesses. The size of the encryption key SMk is greater than or equal to 128 bits and, preferably, greater than or equal to 256 bits.

The database BD is, according to the example shown, saved on a data server SD which is connected to the communications network R. In the case presented, the data server SD is separate from the security module SM but the database and/or the data server could be integrated into the security module.

The database comprises at least one record for the user U and preferably several records associated with multiple users.

For a given user U, the corresponding record comprises, for example, the following data:
- An element identifying the user, Uid.
- An element ZK(PIN) authenticating the user U.
- An identification element Tid belonging to at least one terminal associated with the user U.
- An element ZK(Rsk) authenticating the terminal.
- The user U's cryptographic data Usk.

The same user U (physical person) can have multiple Uids and PINs and thus use separate cryptographic data Usk from the same or different terminals T according to the context of use.

The user's authentication element ZK(PIN) is established from a password PIN known to the user alone. Such a password PIN is usually formed by a sequence of a limited number of characters, preferably greater than or equal to four, in such a way as to allow easy recall by the user U. The authentication element ZK(PIN) is preferably separate from the password PIN and includes a proof of knowledge of the aforesaid password PIN that can be used in the context of a zero disclosure authentication protocol. Such a protocol, also called a "zero-knowledge protocol", as its name suggests, can be used to check the mutual knowledge of an item of information that is usually a secret, by two separate systems without the information itself being communicated.

The terminal's authentication element ZK(Tsk) is established from the secret key Tsk which only the terminal is in possession of. The authentication element ZK(Tsk) is preferably separate from the secret key Tsk and comprises a proof of knowledge of the aforesaid secret key that can be used in the context of a zero disclosure authentication protocol.

In view of their importance and their critical nature, the user U authentication element ZK(PIN), the terminal T authentication element ZK(Tsk) and the user U's cryptographic data Usk are preferably stored in the database BD, encrypted in such a manner as to protect the privacy of the contents of ZK(x) and the integrity of the association between the "Uid ZK(PIN)" and "Tid ZK(Tsk)" pairs respectively.

According to the invention, the user U's cryptographic data Usk will be implemented by the security module SM which will then carry out the authentication of the user U and the terminal T. Thus the user's authentication elements ZK(PIN) and the terminal T's ZK(Tsk) are intended to be used by the security module SM such that their encryption by means of a key SMk specific to the security module SM contributes effectively to their protection in the event of unauthorized access, disclosure or alteration of the contents of the database BD.

The user's cryptographic data Usk, for its part, is meant to be used within the security module SM after authentication of the user U and the user's terminal T which is available for the user's use, or which is associated with him/her.

In this context, encryption using the key SMk specific to the security module ensures that the user's cryptographic data Usk is only used in the security module SM. Encryption by means of the terminal's secret key Tsk ensures that the user's cryptographic data Usk is only usable (decipherable) in the presence of the terminal T by means of the secret key Tsk. Encryption using the user's password PIN ensures that the user's cryptographic data Usk is only usable (decipherable) in the presence of the user U. This last aspect guarantees the non-repudiation by the user of the implementation of the cryptographic data associated with him/her to the extent that these latter may only be implemented in his/her presence.

Thus, a first encryption of the user's cryptographic data Usk can be carried out by means of the user's password PIN, in such a manner so as to obtain the initial encrypted data ENC(PIN,Usk). This initial encrypted data ENC(PIN, Usk) can then be the subject of a second encryption using the terminal's secret key so as to obtain the second item of encrypted data ENC(Tsk,ENC(PIN,Usk)). This second items of encrypted data ENC(Tsk,ENC(PIN,Usk)) can then be the subject of a third encryption by means of the security module's secret key SMk in such a manner so as to obtain the third item of encrypted data ENC(SMk,ENC(Tsk,ENC(PIN, Usk))) which will be saved in the database BD. It will be noticed that the encryption sequence is carried out in ascending order of key entropies, the weakest key being used first.

In a preferred form of implementation of the invention, encryption by means of the user's password PIN and the terminal's secret key Tsk is carried out by using an encryption key KDF established from the terminal's secret key Tsk and the user's password PIN. The encryption key KDF is for example a key KDF(Tsk,PIN) which is derived from the terminal's secret key Tsk and the user's password PIN by means of a key derivation function such as for example the function KDF3 defined by the ISO-18033-2 or NIST SP800-56A standard.

The user's cryptographic data Usk is then subject to a first encryption by means of a first encryption key corresponding to the derived key KDF(Tsk,PIN), which allows you to obtain the encrypted data ENC(KDF(Tsk,PIN),Usk). This encrypted data is then subject to a second encryption by means of a second encryption key corresponding to the key that is specific to the security module SMk, which allows you to obtain the encrypted data ENC(SMk, ENC(KDF(Tsk,PIN),Usk)) saved in the database BD. The use of the derived key KDF(Tsk,PIN) strongly links the joint authentication of the terminal T and the user U to the extent that this derived key can only be obtained in the simultaneous presence of the terminal T and the user U. The encrypted data ENC(SMk, ENC(KDF(Tsk,PIN),Usk)) corresponds to the encrypted form of the user's cryptographic data Usk present in the database BD.

The data present in the database will have been stored in the context of an initialization step being supplied by the security module which alone is able to hold the encryption key SMk used here in the context of symmetric encryption. The fact that it is the security module SM that supplies the sensitive data avoids any corruption of the data contained in the database BD. This guarantees that only the security module will be able to use the sensitive data present in the database BD. Thus the measures used to protect the database do not need to be as strong as the ones implemented for the security module.

During the initialization step the terminal's secret key Tsk and the user's password PIN are chosen and the security module SM saves the associated authentication data in the database in the encrypted form described previously. In the context of the initialization step, the terminal's secret key Tsk and the user password PIN can for example, be generated by an automated process and sent to the user by secure mail. The initialization step may also involve a first connection to the security module SM by means of a one-time password with high entropy that has been sent to the user by secure mail. The terminal's secret key Tsk and the user password PIN are then chosen or determined in the context of this first connection and the security module stores them in the database BD as explained above.

Subsequent to the initialization step, when the user U wishes, according to the example shown, to sign an electronic document by means of an application running on the terminal T.

Figure 2:
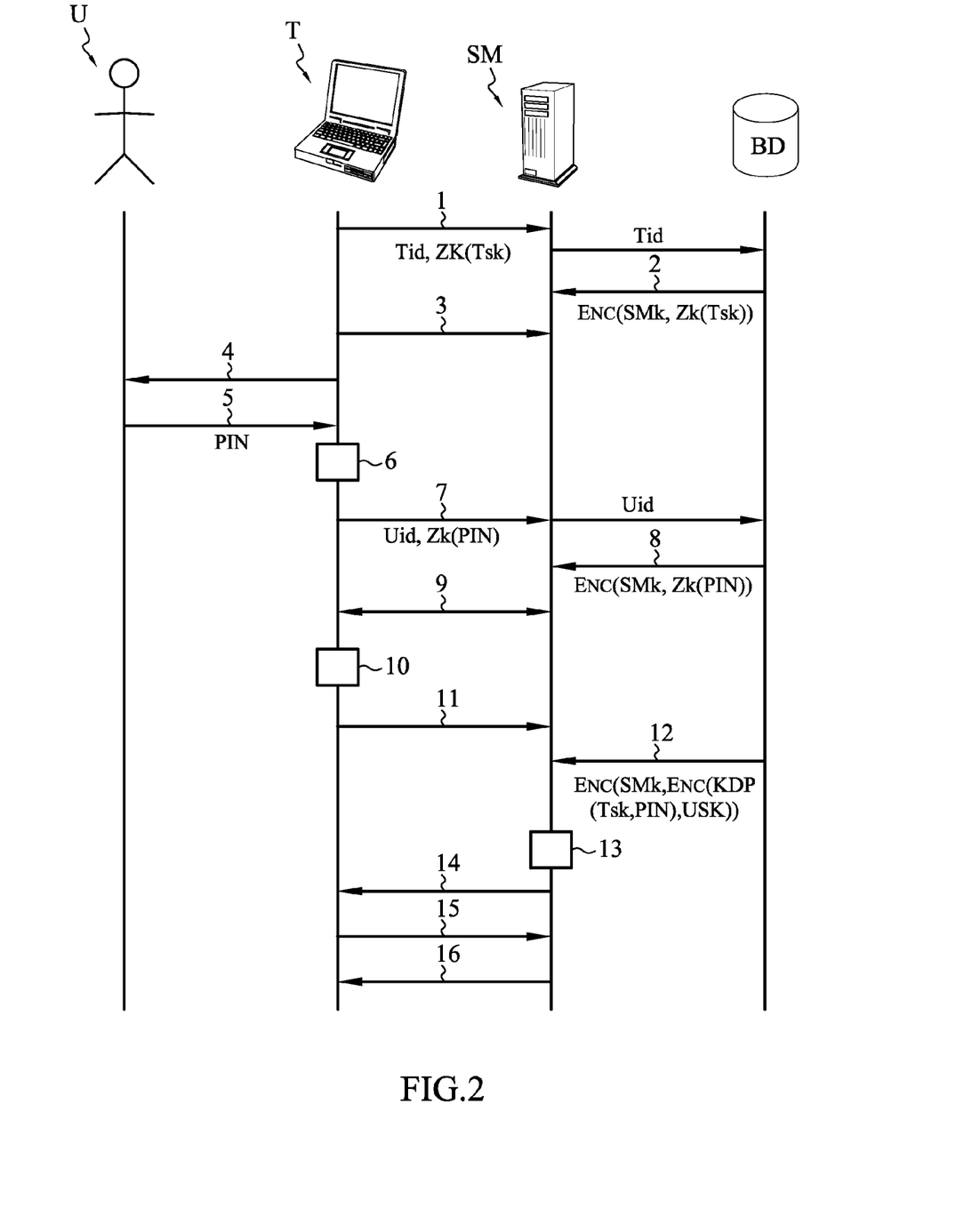
FIG. 2 shows in diagram form the different steps of a first form of the process, according to the invention, of the implementation of a user's cryptographic data within the framework of the context shown in FIG. 1 of the digital signature of an electronic document.

A secure communication channel CS is first established between the terminal T and the security module SM. In step 1, the terminal T then sends a request to establish the secure communication channel by sending the terminal identifier Tid and the terminal's authentication element ZK(TSK).

In step 2, the security module SM obtains from the database BD, preferably via a secure communication with mutual authentication, the authentication element ZK(TSK) as saved in encrypted form ENC(SMk, ZK(Tsk)) by means of the secret key SMk belonging to the security module SM in the database BD. The terminal identifier Tid is then used as an index to query the database BD.

In step 3, a secure channel CS is established with a unique session key by means of a zero disclosure protocol using the authentication element ZK(Tsk) which will have been decrypted by the security module SM by means of its secret key SMk. This secure channel CS is only established in case of positive authentication of the terminal T.

The zero disclosure protocol implemented in step 3 is a protocol, the principle of operation of which is described in particular by Louis Guillou and Jean-Jacques Quisquater in the article "How to Explain Zero-Knowledge Protocols to Your Children" CRYPTO '89—Proceedings of the 9th Annual International Cryptology Conference on Advances in Cryptology published in 1990 by Springer-Verlag London.

The zero disclosure protocol used in step 3 permits, on the one hand, the security module SM to authenticate the terminal T by checking that the terminal T actually has the secret key Tsk without this secret key Tsk being carried on the network in the context of this authentication phase. The zero disclosure protocol used in step 3, on the other hand, permits the terminal T to authenticate the security module SM, by checking that the security module SM actually has the proof of knowledge of the secret key ZK(Tsk) without there being a need for this proof of knowledge of the secret key ZK(Tsk) to be carried on the network in the context of this authentication phase.

Authentication of the security module SM by means of ZK(Tsk) creates an obstacle to so-called "man in the middle" attacks and thus prevents disclosure of authentication data to an unauthorized third party. Authentication of the security module SM could be carried out by means of X509 type certificates. However this manner of proceeding imposes complex processes for updating certificates that are avoided by the implementation of the zero disclosure protocol in step 3.

In addition according to the example shown, the fact of first authenticating the terminal T allows you to use authentication data Tsk or ZK(TSK) which has high entropy much superior to that of the user authentication data, that is his/per password PIN. The implementation of the security module SM protects against brute-force attacks by limiting the number of attempts possible. In addition, the initial use of authentication data separate from the user's password and with high entropy protects against distributed attacks which consist of testing the most used passwords for a large number of users and ends up finding the correct password for a user statistically before the mechanism that limits the number of attempts per user comes into action.

After mutual authentication of the terminal T and the security module SM and the secure communication channel is established, authentication of the user U is carried out. In step 4, the terminal T asks the user to enter his/her password PIN for example by means of the keyboard C or, preferably, via a graphical interface which limits the risk of the password being leaked. In step 5, the user U enters his/her password PIN and in step 6 the terminal establishes an authentication element ZK(PIN) from this password and in this case presents proof of knowledge from the engine that can be used in the context of a zero disclosure protocol.

In a step 7, the terminal T sends the security module SM, via the secure communication channel established in step 3, the user identifier Uid and the latter's authentication element ZK(PIN). Then in step 8, the security module SM obtains from the database BD, still in the context of a secure communication with strong authentication, the user authentication element ZK(PIN) in encrypted form ENC(SMk, ZK(PIN)) by means of the secret key belonging to the security module SM.

In step 9, the security module SM uses the authentication element ZK(PIN) that it has decrypted to authenticate the user U also in the context of a zero disclosure protocol.

It is important to note that preferably authentication of the terminal T occurs before authentication of the user U. However, to the extent that the terminal T is associated with the user U, in case of the theft or discovery of Tsk the attacker can only test the password PIN specific to the user U. However, the security module SM is an obstacle to a brute force attack while the fact that there is only one user U or a very low number of users associated with the same terminal T prohibits an attack via the distributed method.

At this stage, a secure channel of communication CS has been established between the terminal T and the security module SM while the user U and the terminal T have been authenticated by the security module SM and the security module SM has been authenticated by the terminal T. The security channel CS is only of course established if positive mutual authentication takes place.

In step 10, the terminal T derives, from its secret key Tsk and the password PIN, the encryption key KDF(Tsk,PIN) and then in step 11 sends it, via the secure communication channel CS, to the security module SM. After sending it, the terminal T clears the password PIN and the derived encryption key KDF(Tsk,PIN) from its memory. It is important to note that the password PIN can be deleted immediately after the encryption key KDF(Tsk,PIN) has been established.

In step 12, the security module SM obtains, from the database BD, the user's cryptographic data Usk in its encrypted form ENC(SMk, ENC(KDF(Tsk,PIN),Usk)).

In step 13, the security module SM first of all decrypts the user's cryptographic data Usk by means of his/her secret key SMk then by means of the derived key KDF(Tsk,PIN). At this stage, the security module SM has no more need of the derived key KDF(Tsk,PIN) and may clear it while the user's cryptographic data Usk is ready to be used and is therefore in an active state.

In step 14, the security module SM sends the terminal T information according to which the implementation of the user's cryptographic data is possible.

In the context of an electronic signature, in step 15 the terminal T sends the security module SM, via the secure communication channel CS, one or more digital fingerprints SH(DOC) for the electronic document to be signed. In step 16 the security module SM calculates a signature value corresponding to the encryption ENC(Usk,SH(DOC)) of the digital fingerprint SH(DOC) by means of the user U's cryptographic data Usk and returns this value to the terminal T, via the secure communication channel CS. The terminal T can then complete the signature process from the value received from the security module SM.

When step 16 is finished, the security module SM can erase the user's cryptographic data Usk and the secure communication channel CS is closed.

It appears that the method according to the invention permits the implementation of a user's cryptographic data from the user's terminal without that cryptographic data ever needing to be present on the terminal and without it being subject to the risk of disclosure or corruption. In addition, authentication of the user combined with that of the terminal achieves stronger authentication than that which would be obtained by authentication of the user alone. Furthermore, the implementation of a remote security module SM as well as a remote database BD allows you to implement mechanisms for monitoring access and access attempts to the systems incorporating the security module and the database. These monitoring mechanisms in particular act as obstacles to brute force attacks and permit the implementation of fraud detection mechanisms by environmental (origin of queries, date and time . . . ) or behavioural (statistics of use) analysis.

Figure 3:
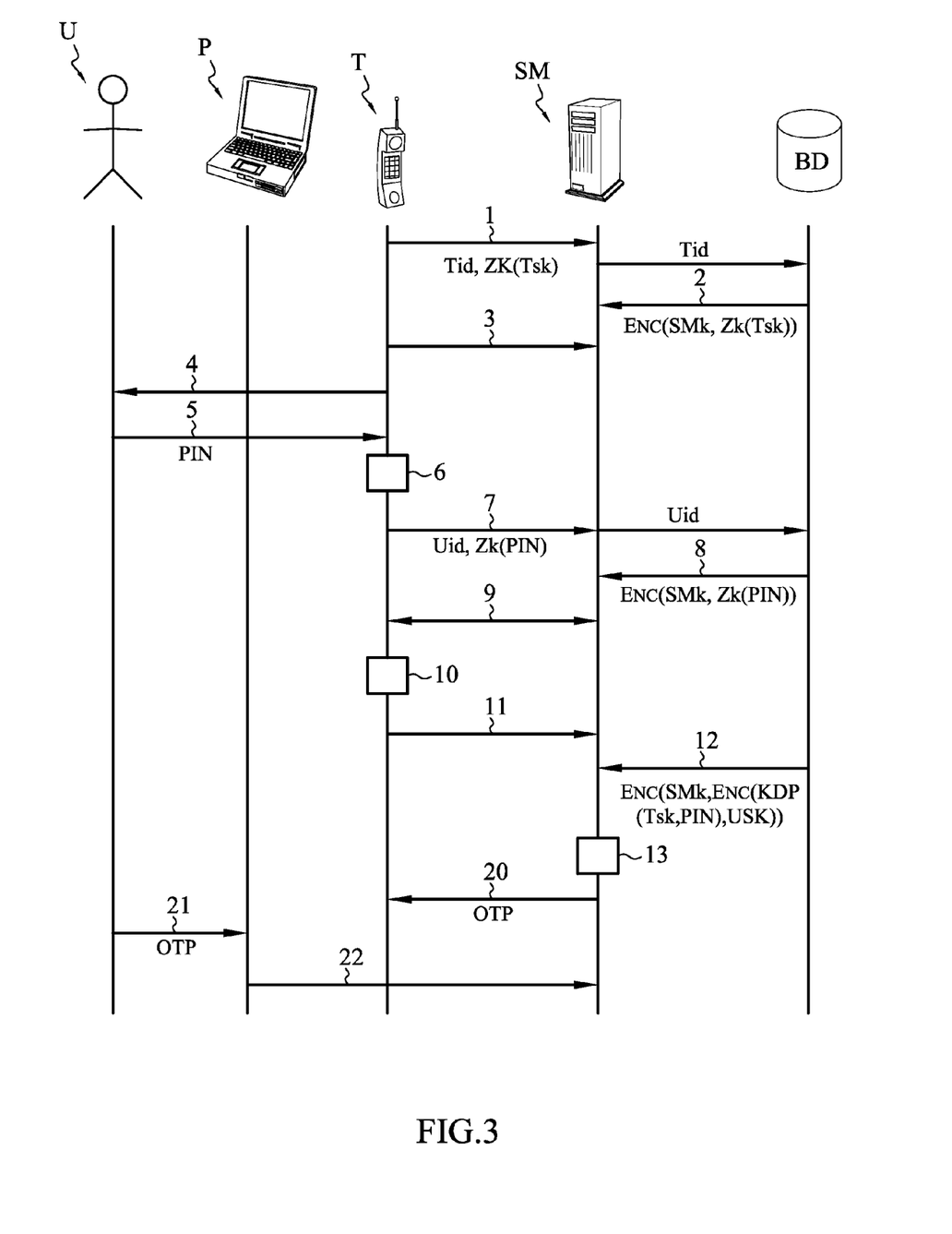
FIG. 3 shows in diagram form, another possible context of implementation of the invention.
Figure 4:
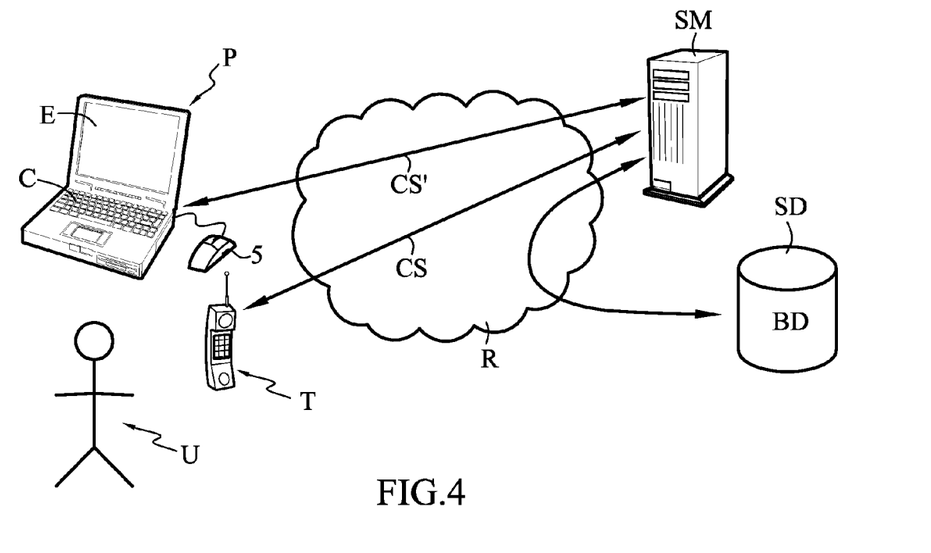
FIG. 4 shows in diagram form the different steps of a second form of the process, according to the invention, of the implementation of a user's cryptographic data within the framework of the context shown in FIG. 3 of the digital signature of an electronic document.

According to the example described previously in connection with FIGS. 1 and 2, the data to be processed is sent to the security module SM by the terminal T used by the user U. However, according to the invention, the data to be processed can be sent to the security module SM by another computing device. Thus, FIGS. 3 and 4 illustrate another form of implementation of the invention according to which the data to be processed is sent to the security module SM by a workstation P separate from the terminal T.

According to the example shown the workstation P is formed, for example, by a personal computer comprising a user interface. According to the example shown, the user interface consists of a screen E, which may be a touch screen or not, combined with a keyboard C, as well as a pointing device S, such as a mouse for example. The workstation P is also connected to the communication network R.

The terminal T in its turn, is formed by a mobile device such as a mobile phone also connected to communications network R.

User U wishes, for example, to sign a document digitally prepared on the workstation P. The method according to the invention then implements the steps as shown in FIG. 4.

The user's cryptographic data Usk is first of all enabled within the security module SM by the implementation of steps 1 to 13 as described previously.

Once the cryptographic data Usk is ready to be implemented within the security module SM, the latter sends, in step 20, a one-time password OTP to terminal T with a view to its display. In step 21, the user enters the one-time password OTP on the workstation P. In step 22, the workstation P uses this one-time password OTP to establish a secure communication channel CS' with the security module SM in the context of a protocol involving strong user authentication. In a variant, a mutual zero disclosure authentication protocol could be considered, when the data to be transmitted to the SM is sensitive. In such a case, the workstation P authenticates the SM before transmitting the data, and the SM authenticates the workstation P prior to making use of the key Usk.

The secure communication CS' channel is then used by, on the one hand, the workstation P to send the data to be processed to the security module SM as described for step 15 and, on the other hand, by the security module SM to send the result of the processing to the workstation P as described for step 16.

It must be noticed that establishing the secure communication channel CS' between the workstation P and the security module SM could also take place before the user's cryptographic data is enabled within the security module SM.

In the examples described previously, authentication of the terminal T and of the user U is carried out in succession. However, according to the invention it is possible to achieve these two authentications in a joint manner. To do this it, a proof of knowledge ZK(KDF(Tsk,PIN)) of the key KDF(Tsk, PIN) can be used in the context of a zero disclosure protocol at the time communication is established between the terminal T and the security module. In this case the password PIN is entered on the terminal T, then the derived key KDF(Tsk, PIN) is generated before authentication and communication is established between the terminal T and the security module SM. In this case the proof of knowledge ZK(KDF(Tsk,PIN)) is saved in the database BD.

According to the example of the implementation of the invention described previously the encrypted form of the user's cryptographic data Usk present in the database BD corresponds to ENC(SMk, ENC(KDF(Tsk,PIN),Usk)). However, according to the invention, the user's cryptographic data Usk can also be subject to a first encryption by means of a first encryption key corresponding to the key specific to the security module SMk, which allows you to obtain the encrypted data ENC(SMk, Usk). This encrypted data is then subject to a second encryption by means of a second encryption key corresponding to the derived key KDF(Tsk,PIN), which allows you to obtain the encrypted data ENC(KDF(Tsk,PIN), ENC(SMk,Usk)), which is then saved in the database BD. This approach means that a new terminal T' can be associated with the user U without the need to know or to decipher the user's secret key Usk. In fact, in a step involving the registration of a new terminal T' associated with a secret key T'sk, the user U can, by means of his/her terminal T that has already been registered, be authenticated, along with terminal T, with the security module SM as previously described in steps 1 to 12. By means of KDF(Tsk,PIN) the security module SM decrypts ENC(KDF(Tsk,PIN), ENC(SMk,Usk)) in order to obtain ENC(SMk,Usk) which it can then once again encrypt by means of KDF(T'sk,PIN) which it has obtained via a secure channel established after mutual authentication of the new terminal T' and the security module SM carried out for example by means of a one-time password displayed on the first terminal T or an activation code sent to the user by an alternative means (in a non-exhaustive manner, by mail, telephone, SMS, email). Once this registration is completed, the new terminal T' can be used in the same way as terminal T.

In the forms of implementation described above, the user's password PIN is used as an element to authenticate the user. However, biometric data such as a fingerprint read by means of a fingerprint reader fitted to the terminal T could also be used as the element to authenticate the user. In the context of this form of implementation, the database BD, on the one hand comprises a first user authentication element comprising biometric data relating to the user's fingerprint and, on the other hand, a second user authentication element comprising the user's password PIN.

This form of implementation of the method according to the invention first of all uses steps 1 to 3 of authentication of the terminal T and of the security module SM as well as the establishment of a secure communication channel CS. Then authentication of the user U takes place. To this end, the user U has his/her fingerprint read by the fingerprint reader attached to terminal T. The result of this reading is sent to the security module SM via the secure channel CS. The security module SM makes a comparison between the result of reading the fingerprint and the first element of user authentication it obtains from the database BD. In the event of a positive comparison, the method continues with a request to enter the user U's password on the terminal T up to the implementation of the user's cryptographic data as described previously for steps 4 to 16.

Preferably, the terminal implements a client module which manages the various steps in the method according to the invention and, in particular, the various calculations, input requests and communication with the security module used in the initialization and implementation phases of the invention.

Of course, various other modifications can be made to the invention in the context of the appended claims.

The invention claimed is:

1. A method for the implementation, via a security module (SM), of a user U's cryptographic data (Usk) stored in a database (BD), by means of a terminal (T) that the user uses and which communicates with the security module (SM) via a communication network (R), the method comprising the following steps and sequences:
   an authentication sequence comprising the following successive steps:
   mutual authentication between the security module (SM) and the terminal (T), based on an asymmetric cryptographic protocol, establishing a secure channel between the security module (SM) and the terminal (T);
   in the event of a positive mutual authentication of the security module and the terminal;
   mutual authentication of the security module and the user based on an asymmetric cryptographic protocol;
   in the event of a positive mutual authentication between, on the one hand, the security module and the terminal and, on the other hand, the security module and the user:
   the security module (SM) obtains the user's cryptographic data (Usk) from the database (BD), the cryptographic data being stored in the database (BD) in encrypted form by means of at least a first encryption key (KDF(Tsk, PIN)) established from at least one secret key from the terminal (Tsk) and the user's authentication element (PIN) and by means of a second encryption key (SMk) specific to the security module (SM), encryption by means of the second encryption key taking place after encryption by means of the first encryption key;
   the terminal calculates the first encryption key (KDF(Tsk, PIN));
   the terminal sends the first encryption key to the security module via the secure channel; and
   implementation of the user's cryptographic data (Usk) by the security module (SM) after decryption, by the security module (SM) of the user's cryptographic data (Usk) at least first of all by means of the second encryption key (SMk) and then the first encryption key (KDF(Tsk, PIN)).

2. Method according to claim 1, wherein the step of mutual authentication is based on:
   at least one terminal authentication element (ZK(Tsk)); and
   at least one user authentication element (ZK(PIN));

obtained by the security module (SM) from the database (BD), the authentication elements being stored in the database (BD) in encrypted form by means of an encryption key (SMk) specific to the security module (SM).

3. Method according to claim 2, wherein the method uses a terminal authentication element ZK(Tsk) established at least in part from a terminal secret key (Tsk) stored in the terminal (T).

4. Method according to claim 3, wherein the terminal authentication element comprises a proof ZK(Tsk) of possession of the terminal secret key (Tsk) via the terminal (T) intended to be used in the context of a zero disclosure authentication protocol.

5. Method according to claim 2, wherein the user (U) authentication element (ZK(PIN) is established at least in part from a password (PIN) entered by the user (U).

6. Method according to claim 5, wherein the user (U) authentication element comprises a proof ZK(PIN) of knowledge of the password PIN intended to be used in the context of a zero disclosure authentication protocol.

7. Method according to claim 1, wherein the security module (SM) implements the user's cryptographic data (Usk) to perform cryptographic processing on data to be processed that is received via the communication network (R) and secured by the secure channel established during mutual authentication between the security module and the terminal.

8. Method according to claim 7, wherein the data to be processed comprises the data used in the context of a digital signature process for an electronic document.

9. Method according to claim 1, wherein the terminal implements a client module which manages at least communications with the security module, input of the user authentication element, the authentication sequence and calculation of the first encryption key.

10. Method according to claim 9, wherein the client module is suitable for:

retaining the value of the client authentication element from the time of its input by the user and up to calculation of the first encryption key;

clearing the value of the authentication element after calculation of the first encryption key; and clearing the value of the first encryption key after sending it to the security module.

11. Method according to claim 9, wherein the client module is adapted to prevent access to the value of the client authentication element and to the value of the first encryption key via another resource or another program, from the terminal or external to the terminal, other than the security module.

12. Method according to claim 7, wherein the client module transmits the data to be processed to the security module.

13. Method according to claim 9, wherein the client module transmits the data to be processed to the security module.

* * * * *